United States Patent
Tse

[19]

[11] Patent Number: 5,572,599
[45] Date of Patent: Nov. 5, 1996

[54] MONOCHROME TO FULL COLOR SCALEABLE IMAGE PROCESSING SYSTEM FOR PRINTING SYSTEMS AND MACHINES

[75] Inventor: Francis K. Tse, Rochester, N.Y.

[73] Assignee: Xerox Corporation, Stamford, Conn.

[21] Appl. No.: 273,261

[22] Filed: Jul. 11, 1994

[51] Int. Cl.$^6$ .................... G06K 9/48; H04N 9/77
[52] U.S. Cl. .................... 382/162; 382/304; 358/515; 348/663
[58] Field of Search .................... 382/17, 54, 162, 382/164, 166, 167, 304; 358/515, 529, 534; 348/666, 663; 101/171

[56] References Cited

U.S. PATENT DOCUMENTS

| | | | |
|---|---|---|---|
| 4,814,790 | 3/1989 | Nitta | 346/76 |
| 5,028,992 | 7/1991 | Arai | 358/501 |
| 5,220,417 | 6/1993 | Sugiura | 358/515 |
| 5,260,949 | 11/1993 | Hashizume et al. | 371/22.3 |
| 5,283,670 | 2/1994 | Capitant et al. | 358/530 |
| 5,357,354 | 10/1994 | Matsunawa | 358/530 |
| 5,369,510 | 11/1994 | Taguchi | 358/529 |

*Primary Examiner*—Jose L. Couso
*Assistant Examiner*—Matthew C. Bella
*Attorney, Agent, or Firm*—Michael J. Nickerson

[57] ABSTRACT

To make the architecture of an image processing module of a monochrome printing machine convertible to a full color printing machine, bypass circuits are included in the luminance processing circuit of the monochrome printing system. These bypass circuits are inserted between a conventional shading circuit and conventional two-dimensional filter and auto-segmentation circuit of the luminance image processing system and between a conventional brightness adjustment circuit and a conventional one-dimensional image processor/screening circuit of the luminance image processing system. This inclusion of bypass circuits enables a chroma processing circuit to be installed in parallel with the luminance processing to make the monochrome system convertible to a full color system. The converted full color system utilizes the luminance processing system of the monochrome system to realize fully color processed signals ready for transmission to a printing subsystem.

11 Claims, 4 Drawing Sheets

MONOCHROME TO FULL COLOR SCALEABLE IMAGE PROCESSING SYSTEM FOR PRINTING SYSTEMS AND MACHINES

FIELD OF THE PRESENT INVENTION

The present invention is directed to an image processing system for a printing machine. More specifically, the present invention is directed to the architecture of an image processing system for a monochrome printing system which is capable of scaling to include color functions without redesigning the system's architecture.

BACKGROUND OF THE PRESENT INVENTION

Conventionally, electronic reprographic machines are designed to be either monochrome or full color. Examples of such conventional machines are illustrated in FIGS. 1 and 2 of the present application. More specifically, FIG. 1 illustrates a conventional monochrome electronic reprographic machine and FIG. 2 illustrates a conventional color electronic reprographic machine.

With respect to FIG. 1, the conventional electronic reprographic machine includes a black and white sensor 1 which receives the image reflected from a scanned document. The black and white sensor 1 converts the received image into digital signals which are fed into a video preprocessor 3. The video preprocessor corrects for any offset or gain drift in the video signal being outputted by the black and white sensor 1. The preprocessed video signal is then fed into a luminance image processing system 5 which performs the necessary image processing operations upon the video signal and prepares the video signal to be used to print a document. The image processed video signal is then fed into an electronic precollation memory 7 which stores the video signal for later use in a printing operation. When the image is to be printed by the electronic reprographic machine, the video signals read out of the electronic precollation memory 7 and fed into a raster output scanner 9. The raster output scanner 9 converts the video image signal into light pulses via a laser wherein the light pulses interact with a xerographic printing system 11 to produce a black and white document representing the image scanned by the black and white sensor 1.

With respect to FIG. 2, the conventional electronic reprographic machine includes a color sensor 101 which receives the image reflected from a scanned document. The color sensor 101 converts the received image into digital signals which are fed into a video preprocessor and stitcher 103. The video preprocessor and stitcher corrects for any offset or gain drift in the video signal being outputted by the color sensor 101 and stitches together the separated color image data. The processed video signal is then fed into a color image processing system 105 which performs the necessary image processing operations upon the color video signal and prepares the video signal to be used to print a document. This processed video signal is then fed into an electronic precollation memory 7 which stores the video signal for later use in a printing operation. When the image is to be printed by the electronic reprographic machine, the video signal is read out of the electronic precollation memory 7 and fed into a raster output scanner 9. The raster output scanner 9 converts the video image signal into light pulses via a laser wherein the light pulses interact with a color xerographic printing system 111 to produce a color document representing the image scanned by the color sensor 1.

Conventionally, if one were to convert a monochrome electronic reprographic system into a full color electronic reprographic system, one would have to totally redesign the electronic reprographic system to represent a color system thereby incurring substantial engineering cost. In other words, to realize a full color electronic reprographic machine, from a monochrome electronic reprographic machine, one would have to completely breakdown the monochrome electronic reprographic machine and rebuild the machine with various new subsystems to make the machine capable of full color reproduction. Such a redesign incurs substantial cost and time in building the full color electronic reprographic machine from a monochrome electronic reprographic machine.

Therefore, it is desirable to design an architecture for a printing system or machine which allows a user to easily convert from a monochrome system to a full color system without incurring substantial engineering cost or time. Moreover, with the advent of digital technology and open architecture and platforms, it is desirable to design an architecture for a printing machine or system which is capable of being readily converted from monochrome to full scale color by inserting a single image processing module into the system.

SUMMARY OF THE PRESENT INVENTION

A first aspect of the present invention is a luminance image processing module. This luminance image processing module includes a first processing circuit for processing image data and a first bypass circuit for controlling whether the image data processed by the first processing circuit will pass through the first bypass circuit. A second processing circuit processes the processed image data passing through the first bypass circuit. Then, a second bypass circuit controls whether the image data processed by said second processing circuit passes through the second bypass circuit. Lastly, a third processing circuit processing the image data passing through the second bypass circuit.

A second aspect of the present invention is a color image processing system. This color image processing system includes a first processing circuit for processing a first channel of image data and a second processing circuit for processing a second channel of image data. A first color converter circuit converts the processed image data of the first channel and the processed image data of the second channel into a first color space having a luminance component and at least one chroma component. A third processing circuit processes the luminance component and a fourth processing circuit processes the chroma component. A first bypass circuit which is operatively connected to the first processing circuit, the first color converter circuit, and the third processing circuit, prevents the processed image data of the first channel from being directly communicated to the third processing circuit from the first processing circuit. Operatively connected to the third and fourth processing circuit is a second color converter circuit which converts the processed luminance and chroma components to color values of a second color space. A fifth processing circuit processes the color values of the second color space, and a second bypass circuit, operatively connected to the third processing circuit, the second color converter circuit, and the fifth processing circuit, prevents the processed luminance component from being directly communicated to the fifth processing circuit from the third processing circuit.

A third aspect of the present invention is a method of converting a monochrome processing module to a full color image processing system. The method includes the steps of connecting a green image data input terminal of a chroma processing module to a first output terminal of the monochrome processing module and connecting a luminance output terminal of the chroma processing module to a first input terminal of the monochrome processing module. Moreover, a first bypass circuit connected between the first input and output terminals of the monochrome processing module is disengaged. A luminance input terminal of the chroma processing module is connected to a second output terminal of the monochrome processing module and a color output terminal of the chroma processing module is connected to a second input terminal of the monochrome processing module. Lastly, a second bypass circuit connected between the second input and output terminals of the monochrome processing module is disengaged.

A fourth aspect of the present invention is a monochrome printing system. The monochrome printing system includes an image processing circuit for converting an electronic document of a first format to an electronic document of a second format and a printer for converting the electronic document of the second format to a tangible document. The image processing circuit includes a first processing circuit for processing data representing the electronic document of the first format and a first bypass circuit for controlling whether the data processed by the first processing circuit passes through the first bypass circuit. A second processing circuit processes the data passing through the first bypass circuit and a second bypass circuit controls whether the data processed by the second processing circuit passes through the second bypass circuit. Lastly a third processing circuit processes the data passing through the second bypass circuit.

A fifth aspect of the present invention is a color printing system. The color printing system includes an image processing circuit for converting an electronic document of a first format to an electronic document of a second format and a printer for converting the electronic document of the second format to a tangible document. The image processing circuit includes a first processing circuit for processing a first channel of data representing the electronic document of the first format and a second processing circuit for processing a second channel of data representing the electronic document of the first format. A first color converter circuit converts the processed data of the first channel and the processed data of the second channel into a first color space having a luminance component and at least one chroma component. The image processing circuit also includes a third processing circuit for processing the luminance component and a fourth processing circuit for processing the chroma component. A first bypass circuit, operatively connected to the first processing circuit, the first color converter circuit, and the third processing circuit, prevents the processed data of the first channel from being directly communicated to the third processing circuit from the first processing circuit. Operatively connected to the third and fourth processing circuit, a second color converter circuit converts the processed luminance and chroma components to color values of the second format. A fifth processing circuit processes the color values of the second format, and a second bypass circuit, operatively connected to the third processing circuit, the second color converter circuit, and the fifth processing circuit, prevents the processed luminance component from being directly communicated to the fifth processing circuit from the third processing circuit.

A fifth aspect of the present invention is a printing system. The printing system includes a monochrome printer, a multicolor printer, and a dual mode image processor selectively connected to the monochrome printer or the multicolor printer. The dual mode image processor operates in a first mode when connected to the monochrome printer and operates in a second mode when connected to the multicolor printer. The dual mode image processor includes a luminance processing module, a chroma processing module, and a bypass circuit for connecting the chroma processing module in parallel with the luminance processing module when the dual mode image processor is operating in the second mode and for bypassing the chroma processing module is operating in the first mode.

Further objects and advantages to the present invention will become apparent from the following descriptions of the various embodiments and characteristic features of the present invention.

BRIEF DESCRIPTION OF THE DRAWINGS

The following is a brief description of each drawing used to describe the present invention, and thus, are being presented for illustrated purposes only and should not be limitative of the scope of the present invention wherein.

DETAILED DESCRIPTION OF THE DRAWINGS

Figure 1:
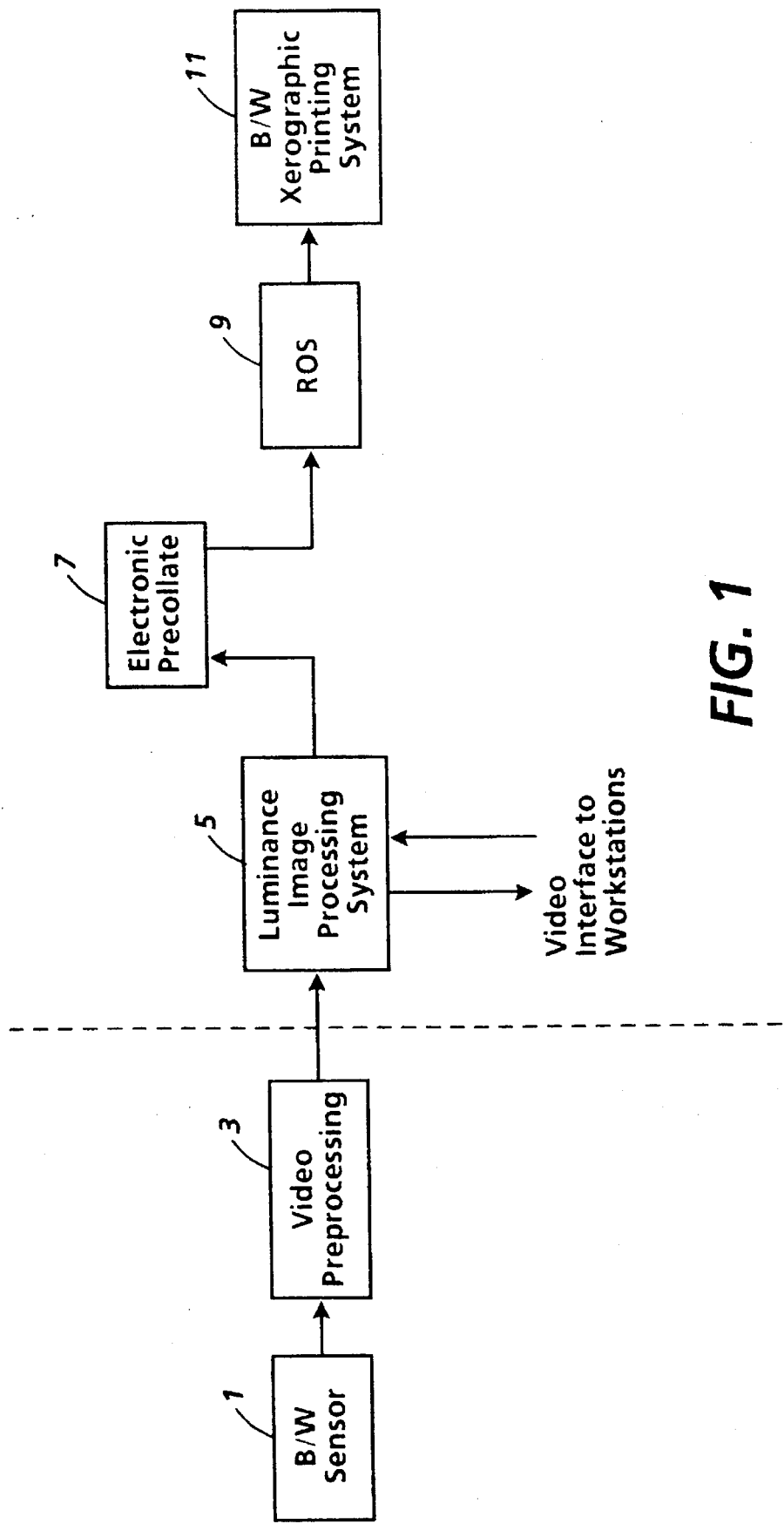
FIG. 1 shows a block diagram illustrating a conventional monochrome electronic reprographic system.

The following will be a detailed description of the drawings illustrating the present invention. In this description, as well as in the drawings, like reference numerals represent the devices, circuits, or equivalent circuits performing the same or equivalent functions.

It is noted that the discussion of the present invention below, with respect to FIG. 3, focuses on an electronic reprographic system; however, this discussion is generically related to any printing system, including but not limited to, xerographic machines, thermal ink jet machines, etc.

As discussed above, conventionally, electronic reprographic machines are designed to be either monochrome or full color. Thus, one would not conventionally convert a monochrome machine to a full color machine due to the excess costs incurred from the redesigning process. In contrast, the present invention proposes an architecture which enables a readily easy conversion with substantially reduced costs.

It is noted that there is a lot of commonality between a monochrome and a full color printing machine. For example, the overall mechanical frame work of the machine; the user interface, if any; the raster output scanner; the electronic precollation memory; and overall machine control electronics are common to both a monochrome and full color printing machine. In view of this vast commonality between monochrome and full color machines, a printing architecture can be designed such that only unique subsystems need to replaced or added to go from a black and white machine to a full color machine.

The major hardware differences between the monochrome and full color electronic reprographic machines are the image sensor and its related video preprocessing subsystems, the image processing subsystem, and the xerographic printing subsystem. Moreover, the major hardware differences between the monochrome and full color printing machines are the image processing subsystem and the image rendering subsystem.

The image sensor on a monochrome machine typically consists of a single CCD array, while the full color machine requires a sensor with multiple arrays. Moreover, the xerographic printing subsystem can be a single pass where all colors are processed in one pass or multi-pass where individual colors are processed in multiple passes. For both the image sensor and the xerographic printing subsystem, new color subsystems need to be installed to replace the monochrome subsystems. The interchangeability of these subsystems is easily implemented and well known. The problem with the conversion process lies in the image processing subsystems. The image processing subsystems of a monochrome and full color machine are not readily interchangeable and require large amounts of redesigning to implement. However, with the architecture of the present invention, the image processing subsystems are readily converted.

Figure 3:
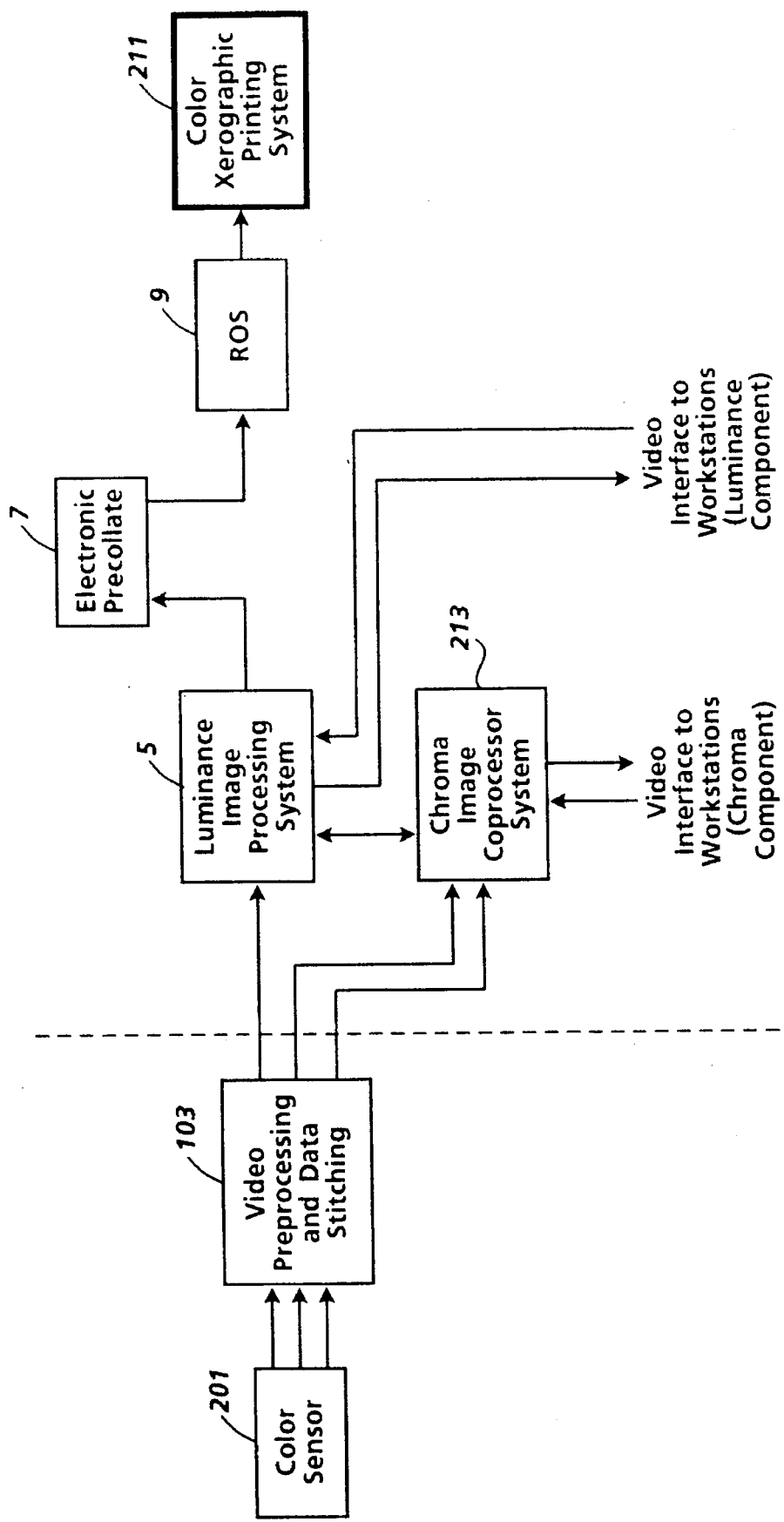
FIG. 3 shows a block diagram illustrating a scalable electronic reprographic system according to the present invention.

FIG. 3 illustrates the architecture of the present invention which readily allows the conversion of a monochrome electronic reprographic machine to a full color electronic reprographic machine. It is noted that all conversion of the components that are left of the vertical dotted line are applicable to a generic printing system.

In the architecture of FIG. 3, the black and white sensor 1 of FIG. 1 is replaced by a color sensor 201. Moreover, the video preprocessor 3 of FIG. 1 is replaced by a video preprocessor and data stitching circuit 203. These conversion are only necessary in implementing a conversion of a monochrome electronic reprographic system to a full color system. The image sensors or preprocessing subsystems are not required in a generic printing system. The remaining discussion is generic to both the conversion of an electronic reprographic machine and a printer.

In keeping with the concept of an open architecture, FIG. 3 illustrates that a chroma image co-processor system 213 is added in parallel to the luminance image processing system of FIG. 1. The luminance image processing system 5 and the chroma image co-processor system 213 act in tandem to provide the color image processing subsystem for a full color printing system. The architecture utilizes essentially the same electronic precollation memory 7 and raster output scanner 9 of the conventional monochrome printing machine in the full color machine. These subsystems are slightly modified to handle the three levels of data, namely red, green, and blue. The raster output scanner 9 converts the video signal into light pulses via a laser which are utilized by a color xerographic printing subsystem 111 to enable reproduction of a document scanned by the color sensor 201 in full color.

As noted above, the architecture of FIG. 3 allows an image processing subsystem to be scalable from monochrome to color by maintaining the original luminance image process subsystem and adding the chroma image co-processor system 213.

FIG. 3 further illustrates that the monochrome sensor and its video preprocessor subsystem are replaced by the color sensor and the video preprocessor and data stitching subsystem when an electronic reprographic system is being converted. The data stitching is necessary in a color system due to the spatial separation of the individual sensor arrays for each color. The replacement color xerographic printing subsystem may be a four pass system; however, it is noted that this xerographic system may be a single pass system. In a four pass system, each pass prints either cyan, magenta, yellow, or black process colors. It is noted that such color xerographic printing subsystems are well known in the art.

Figure 4:
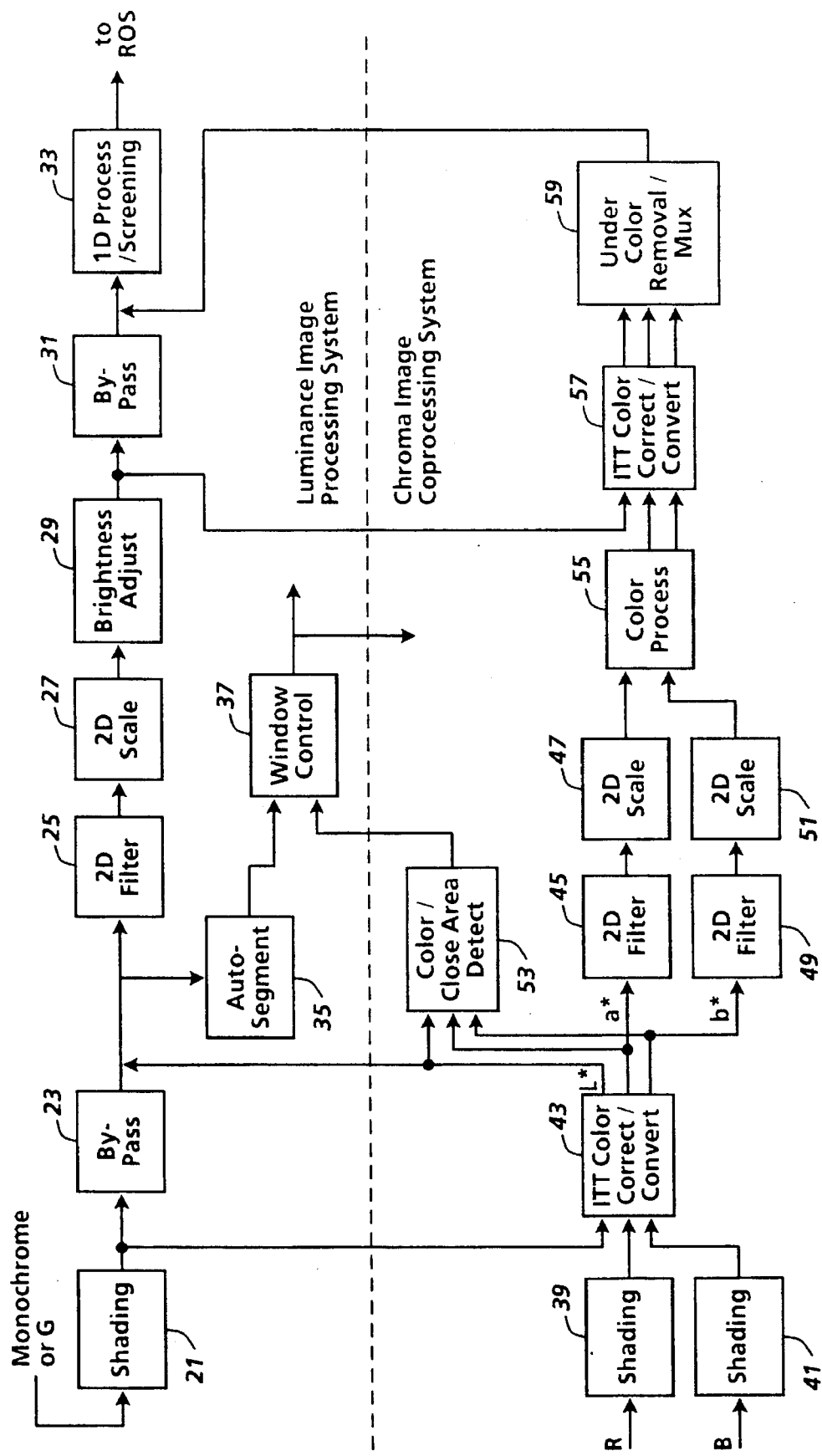
FIG. 4 shows a block diagram illustrating the image processing system of the scalable electronic reprographic system of the present invention.

FIG. 4 illustrates a detailed block diagram demonstrating how the chroma image co-processing subsystem is integrated with the monochrome image processing subsystem of the pre-converted monochrome printing machine. In FIG. 4, the blocks above the dotted line are the circuitry found in the pre-converted black and white or monochrome image processing subsystem of the pre-converted printing machine.

To make the architecture of the monochrome machine convertible to a full color machine, an output terminal, an input terminal, and a bypass circuit is inserted between a conventional shading circuit 21 of the luminance image processing system and conventional two-dimensional filter 25 and auto-segmentation circuit 35 of the luminance image processing system. The output terminal enables the data signal on the original monochrome channel to be input to an input color correction/converter circuit 43 for conversion to L*a*b* space. It is noted that any color space can be utilized wherein the color space includes a luminance component. The input terminal enables the converted luminance signal to be returned to the luminance processing module for proper processing. The bypass circuit 23 is utilized in the monochrome mode, thus bypassing any color processing.

Moreover, a second output terminal, a second input terminal, and a second bypass circuit is inserted between a conventional brightness adjustment circuit 29 of the luminance image processing system and a conventional one-dimensional image processor/screening circuit of the luminance image processing system. The second output terminal enables the processed luminance signal from the brightness adjustment circuit 29 to be input to an output color correction/converter circuit 57 for conversion back to RGB space. The second input terminal enables the converted and under black processed signals to be returned to the luminance processing module for proper processing. The bypass circuit 31 is utilized in the monochrome mode, thus bypassing any color processing. These additions to the conventional luminance image processing circuit of the monochrome system, in addition to extra channels included in the one-dimensional processor/screening circuit 33, allows the chroma processing system to be implemented in parallel to the luminance system to effectuate proper color processing of the color image data.

The operations of the pre-converted machine will be briefly discussed below.

In the pre-converted monochrome machine (a full color electronic reprographic machine), the input video, monochrome signal, is shaded by the shading circuit 21. The shading circuit adjusts for gain and offset error. After being shaded, the monochrome image signal passes through a bypass circuit 23 before entering a two-dimensional filter 25. The filtered signal is then scaled by a two-dimensional scaling circuit 27 and its brightness is adjusted by a brightness adjustment circuit 29. This brightness adjustment circuit 29 can be a toner reproduction curve adjustment circuit.

The adjusted signal then passes through a second bypass 31 before being processed by a one-dimensional process and screening circuit 33. After being screened, the signal is sent to the raster output scanner for printing by a monochrome printing subsystem. In the preferred embodiment of the present invention, the printing subsystem is a monochrome xerographic machine. In this embodiment, the type of filtering and image adjustments are based on the auto segmentation results produced by an auto segmentation circuit 35 and windows programmed in a window controller circuit 37 by the user. It is noted that any conventional auto segmentation or window routine can be utilized in the present invention.

Figure 2:
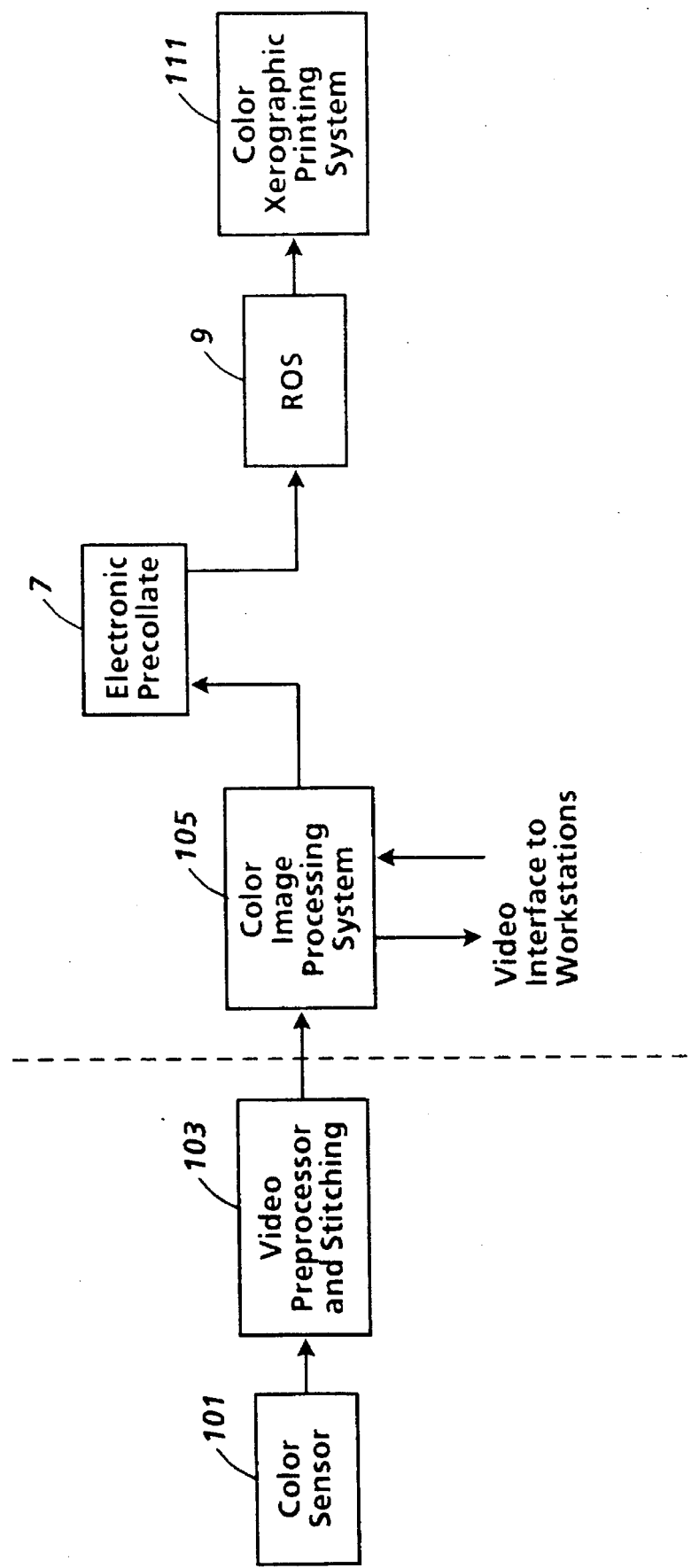
FIG. 2 shows a block diagram illustrating a conventional full color electronic reprographic system.

The auto segmentation circuit 35 classifies whether a pixel is text, low frequency half-tone, high frequency half-tone, or continuous tone. This classification information is sent to the window controller circuit 37 to generate a processing tag that instructs the various image processing modules as to what to do upon the corresponding pixel. This tag information instructs both the luminance image processing subsystem 5 of FIG. 2 and the chroma image co-processing subsystem 213 of FIG. 3.

The operations of the pre-converted machine will be briefly discussed below.

In the converted full color machine, the input video, the input green signal, is shaded by the shading circuit 21. The shading circuit adjusts for pixel to pixel gain and offset error. After being shaded, the input green color image signal is blocked by bypass circuit 23 and fed into the color correction/conversion circuit 43. The input video signals, the input green and blue signals, are shaded by shading circuits 39 and 41, respectively. The shading circuits 39 and 41 adjust for pixel to pixel gain and offset drift. After being shaded, the input color image signals are fed into the color correction/conversion circuit 43. The color correction/conversion circuit 43 converts the red, green, and blue signals to a color space with separate luminance and chroma components. As illustrated in FIG. 4, the RGB values (red, green, and blue) are converted to CIE L*a*b* space. It is noted that this conversion is not limited to the CIE L*a*b* space, but any other space such as L*C*h can be utilized so long as the color space consists of luminance and chroma components.

The luminance component is fed into two-dimensional filter 25. The filtered signal is then scaled by a two-dimensional scaling circuit 27 and its brightness is adjusted by a brightness adjustment circuit 29. The brightness adjusted luminance signal is then fed back into an output color correction/conversion circuit 57.

The chroma components, a* and b*, are fed into two-dimensional filters 45 and 49, respectively. The filtered signals are then scaled by two-dimensional scaling circuits 47 and 51, respectively and color processed by a conventional color process circuit 55. The processed chroma signals are then fed into an output color correction/conversion circuit 57.

The image processed chroma components and luminance component are input to an output color correction and conversion circuit 57. The output terminal color correction and conversion circuit 57 combines the luminance and chroma information so as to convert this information to cyan, magenta, and yellow color space.

The converted CMY signal is fed into an under color removal and multiplexer circuit 59 to extract black information K, which is combined with the CMY information. The resulting CMYK data is multiplexed so that one of the process color components is sent to the one-dimensional processing and screening circuit 33 for processing and screening prior to printing.

In a xerographic system, the processed and screened information is then sent to a raster output scanner for proper conversion to laser pulses that will be utilized in producing a full color reproduction of the image. It is noted that the multiplexed data from the one-dimensional process and screening circuit 33 can be screened to one bit binary format or multiple bit format, depending upon the actual raster output scanner used.

In this embodiment, the type of filtering and image adjustments are based on the auto segmentation results produced by an auto segmentation circuit 35 and windows programmed in a window controller circuit 37. The window controller 37 receives a signal from a color/close area detection circuit 53 to facilitate the producing of the window for image processing. It is noted that any conventional auto segmentation or window routine can be utilized in the present invention.

The auto segmentation circuit classifies whether a pixel is text, low frequency half-tone, high frequency half-tone, or continuous tone. This classification information is sent to the window controller circuit 37 to generate a processing tag that instruct the various image processing modules as to what to do upon the corresponding pixel. This tag information instructs both the luminance image processing subsystem 5 of FIG. 3 and the chroma image co-processing subsystem 213 of FIG. 3.

By using the scalable concept for color image processing, a common luminance image processing module can be built for both a black and white or full color printing machine. This utilization of a common luminance image processing module can reduce the development cost of having to design both a black and white image processing module and a full color image processing module. Also, by having the scalable architecture, a black and white or monochrome printing machine can be readily upgraded in the field to become a full color machine. This scalable image processing system is applicable to stand alone scanners when the image processing is performed in the scanner, printers, as well as, complete electronic reprographic systems.

In another embodiment, the present invention is implemented in a printer controller, such as a file server, in a printing system. The overall printing system includes a monochrome printer, a multicolor printer, and a dual mode image processor as the printer controller. It is noted that a plurality of monochrome or multicolor printers can be included in the overall system. The dual mode image processor is selectively connected to the monochrome printer(s) or the multicolor printer(s) through a multiplexer or other type of switching device. The dual mode image processor operates in a first mode when connected to the monochrome printer(s) and operates in a second mode when connected to the multicolor printer(s). With respect to the present invention, the first mode would correspond to a monochrome mode and the second mode would correspond to a full color mode. This dual mode image processor includes the luminance processing module and the chroma processing module as illustrated in FIG. 4. When in the second mode (full color mode), the bypass circuit is deactivated, thereby connecting the chroma processing module in parallel with the luminance processing module. When in the first mode (monochrome mode), the bypass circuit is active, thereby bypassing the chroma processing module. In this embodiment, a print controller utilizing the full color architecture of the present invention would be able to selectively process the image data according to the type of data, monochrome or multicolor. Moreover, the activation or deactivation can be controlled by a signal produced by a user or information embedded in the image data file, such as a page description language.

Although the present invention has been described in detail above, various modifications can be implemented without departing from the spirit of the present invention. For example, in the preferred embodiment of the present invention, each bypass circuit is contemplated to be an electronic gate coupled between two interface or I/O terminals. When the electronic gate is activated, the image or video data passes through the bypass circuit, thereby bypassing the two interface terminals connected on either side thereof. However, it is possible that each bypass circuit is a jumper cable between two interface terminals, such that when the monochrome system is converted to a full color system, the jumper cables are merely removed. Moreover, if the image data is communicated optically between the various image processing modules, each bypass circuit may comprise a plurality of mirrors which allow the optical system to pass therethrough when the system is a monochrome system, but provide a path of reflection or deflection when the system is a full color system. Thus, disengaging the bypass circuit in the present invention contemplates either the deactivation of an electronic gating device, the removal of a physical jumper cable, or the utilization of mirrors to reflect or deflect the optical communication.

Moreover, the present invention has been described with respect to the converting of RGB data to a color space having a single luminance component and two chroma components. However, it is contemplated by the present invention that the RGB data could be converted to YC space wherein a single luminance component and a single chroma component are produced.

Furthermore, although the present invention has been described with respect to a printing system, the concepts of the present invention are readily applicable to any display system. For example, the image output color correction and conversion circuit in combination with the under color removal and multiplexer circuit could be a circuit which converts the luminance and chroma components to color space having values capable of being reproduced on a display device. Thus, the present invention contemplates the utilization of the convertibility feature in a monochrome display system to enable a monochrome display system to be readily converted to or upgraded to a color display system.

Lastly, although the present invention has been described with respect to receiving RGB data from a scanner, this RGB data can also be generated by a computer.

In summary, the present invention provides an architecture which enables a monochrome image processing system that converts an electronic document of one format to that of another format to be readily upgraded to a full color system.

While the present invention has been described with reference to various embodiments disclosed above, it is not to be combined to the detail set forth above, but is intended to cover such modifications or changes as made within the scope of the attached claims.

What is claimed:

1. A color image processing system, comprising:

first processing means for processing a first channel of image data;

second processing means for processing a second channel of image data;

first color converter means for converting the processed image data of the first channel and the processed image data of the second channel into a first color space having a luminance component and at least one chroma component;

third processing means for processing the luminance component;

fourth processing means for processing the chroma component;

first bypass means, operatively connected to said first processing means, said first color converter means, and said third processing means, for preventing the processed image data of the first channel from being directly communicated to said third processing means from said first processing means;

second color converter means, operatively connected to said third and fourth processing means, for converting the processed luminance and chroma components to color values of a second color space;

fifth processing means for processing the color values of the second color space; and second bypass means, operatively connected to said third processing means, said second color converter means, and said fifth processing means, for preventing the processed luminance component from being directly communicated to said fifth processing means from said third processing means.

2. The color image processing system as claimed in claim 1, further comprising:

auto segmentation means for identifying an image type from the luminance component outputted from said first color converter means; and color detection means for detecting a color area from the chroma component outputted from said first color converter means.

3. The color image processing system as claimed in claim 1, wherein said first and second bypass means each comprises an electronic gate between two interface terminals.

4. The color image processing system as claimed in claim 1, wherein the image data of the first channel is red image data.

5. The color image processing system as claimed in claim 1, wherein said second processing means processes a third channel of image data.

6. The color image processing system as claimed in claim 1, wherein:

said first color converter means converts the image data of the first channel and the image data of the second channel into a color space having a luminance component and two chroma components; and said fourth processing means image processes the two chroma components.

7. A method for converting a monochrome processing module to a full color image processing system, comprising the steps of:

(a) connecting a green image data input terminal of a chroma processing module to an output terminal of the monochrome processing module;

(b) connecting a luminance output terminal of the chroma processing module to an input terminal of the monochrome processing module;

(c) disengaging a first bypass circuit connected between the input and output terminals of the monochrome processing module;

(d) connecting a luminance input terminal of the chroma processing module to another output terminal of the monochrome processing module;

(e) connecting a color output terminal of the chroma processing module to another input terminal of the monochrome processing module; and (f) disengaging a second bypass circuit connected between the another input and output terminals of the monochrome processing module.

8. A color printing system, comprising:

image processing means for converting an electronic document of a first format to an electronic document of a second format; and printer means for converting the electronic document of the second format to a tangible document;

said image processing means including, first processing means for processing a first channel of data representing the electronic document of the first format, second processing means for processing a second channel of data representing the electronic document of the first format, first color converter means for converting the processed data of the first channel and the processed data of the second channel into a first color space having a luminance component and at least one chroma component, third processing means for processing the luminance component, fourth processing means for processing the chroma component, first bypass means, operatively connected to said first processing means, said first color converter means, and said third processing means, for preventing the processing data of the first channel from being directly communicated to said third processing means from said first processing means, second color converter means, operatively connected to said third and fourth processing means, for converting the processed luminance and chroma components to color values of the second format, fifth processing means for processing the color values of the second format, and second bypass means, operatively connected to said third processing means, said second color converter means, and said fifth processing means, for preventing the processed luminance component from being directly communicated to said fifth processing means from said third processing means.

9. The color printing system as claimed in claim 8, wherein said first and second bypass means each comprises an electronic gate between two interface terminals.

10. The color printing system as claimed in claim 8, wherein said second processing means processes a third channel of data representing the electronic document of the first format.

11. The color printing system as claimed in claim 8, wherein:

said first color converter means converts the data of the first channel and the data of the second channel into a color space having a luminance component and two chroma components; and said fourth processing means processes the two chroma components.

\* \* \* \* \*